June 3, 1930.                D. E. WYRE                1,761,098
DRY BATTERY
Filed March 5, 1926
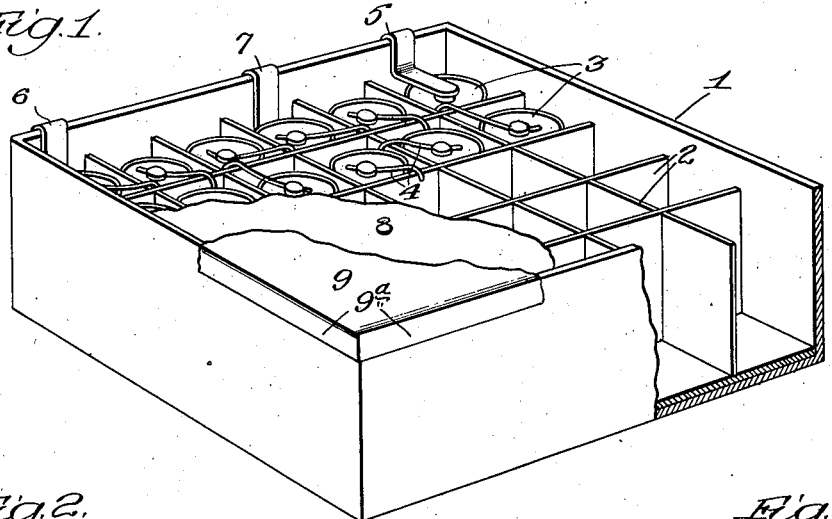
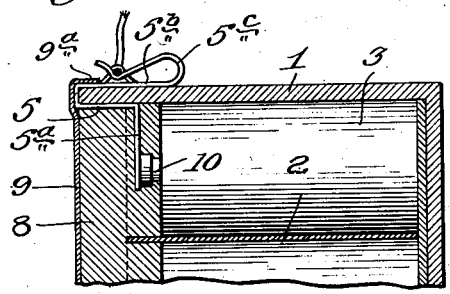
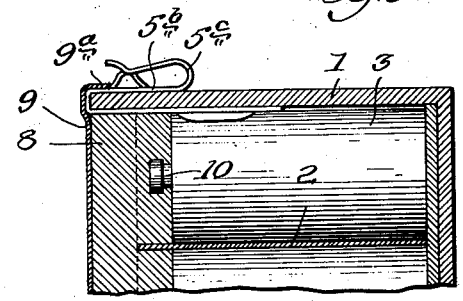
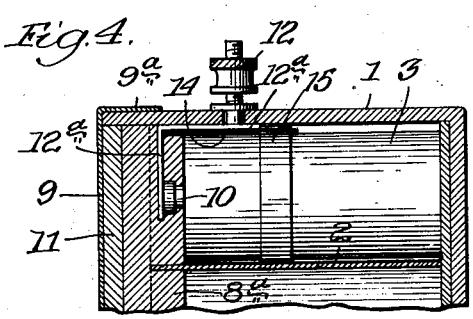
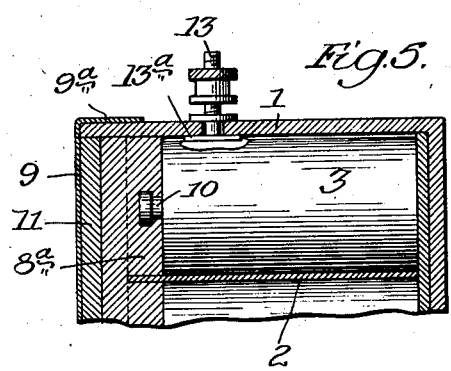
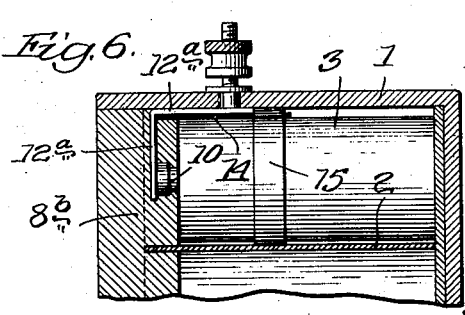
Inventor:
Dwight E. Wyre,
By Dyrenforth, Lee, Chritton & Wiles,
Attys.

Patented June 3, 1930

1,761,098

UNITED STATES PATENT OFFICE

DWIGHT E. WYRE, OF WAUSAU, WISCONSIN

DRY BATTERY

Application filed March 5, 1926. Serial No. 92,462.

This invention relates particularly to dry-batteries of the general type now used for radio purposes.

The primary object of the invention is to provide a battery of the character indicated which is adapted for use in upright position and which can be manufactured at a very moderate cost.

The invention is illustrated in the accompanying drawing, in which—

Fig. 1 represents a broken perspective view of a battery made in accordance with the invention, the view showing the battery resting upon a broad side; Fig. 2, a broken sectional view of the upper portion of the battery, assuming it to be in the upright position, this section being taken at the plane where the positive terminal is connected with the carbon pole of a cell; Fig. 3, a similar broken section taken at a plane where a negative terminal is connected with the zinc cup of a cell; Fig. 4, a broken vertical sectional view showing a modification of the invention, the section being taken at a plane where a positive terminal is connected with the carbon pole of a cell; Fig. 5, a similar broken section of the modification, the section being taken at a plane where a negative terminal is connected with the zinc cup of a cell; and Fig. 6, a broken vertical sectional view similar to Fig. 4, but showing another modification.

Referring to the construction illustrated in Figs. 1–3, the battery comprises a pasteboard box 1 divided into compartments by a pasteboard egg-crate structure 2; a series of dry-cells 3 located in said compartments, these cells being preferably connected in series by means of wires 4; a positive terminal 5 connected with the carbon pole of a cell at one end of the series; a negative terminal 6 connected with a zinc cup of the cell at the other end of the series, a negative terminal 7 connected with the zinc cup of an intermediate cell; a seal 8, composed of pitch, or the like, filling the upper portion of the box 1 above the cells and the spaces in the compartments which contain the cells; and a covering, or label, 9, which may be composed of paper, this covering 9 being cemented, or stuck, to the seal 8 and having margins $9^a$ folded over the edge-portions of the box and secured thereto by a suitable adhesive.

The dry-cells 3 are of the type commonly employed in radio batteries. These cells are inserted in the compartments formed by the egg-crate structure and are then connected in any suitable way, preferably in series.

The terminals 5, 6 and 7 are shown as comprising strips of metal connected with the electrodes of selected cells of one marginal row. These terminals usually are connected by means of solder with the electrodes of the cells. In the illustration given in Figs. 1–3, the positive electrodes 5 has a shank-portion $5^a$ which extends from the cap of the carbon pole 10 to the inner surface of the wall of the box. The shank is provided with a U-shaped loop $5^b$ which embraces the free edge portion of the side wall of the box. The terminal is shown as terminating in a spring-clip $5^c$ adapted to clamp a wire. The terminals 6 and 7 are soldered to the zinc cups of their respective cells and have a formation similar to that described with reference to the terminal 5, except that the shank extends along the side of the zinc cup in the manner shown in Fig. 3.

The paper covering 9 is secured to the seal 8 by means of any suitable adhesive.

In the modification shown in Figs. 4 and 5, the construction is similar to the construction described, except that the terminals are modified, the seal does not extend flush with the free edge of the box, and a pasteboard fillet 11 is introduced between the paper covering and the seal. In this modification, the parts corresponding with the construction described above are designated by the same reference characters. The positive terminal is designated 12 and the negative terminal is designated 13. The terminal 12 is in the form of a screw terminal which extends through a perforation in the end wall of the box. This terminal is soldered at its base to a metal strip $12^a$ which is connected with the carbon pole 10. A pasteboard strip 14 is interposed between the strip $12^a$ and the zinc can of the cell 3. The free end of the strip is secured to the body of the cell by means of the tape 15. The terminal 13 is soldered at its base to the zinc can of the cell, as indicated at 13ª.

It has been found somewhat more satisfactory to interpose the pasteboard plate 11 between the label, or covering, 9, and the seal, designated 8ª. The paper is secured to the pasteboard box by a suitable adhesive.

In the modification shown in Fig. 6, the construction is similar to the construction shown in Fig. 4, except that the seal 8ᵇ completely fills the upper portion of the box 1, so that the outer surface of the seal is flush with the edges of the side-walls of the box. This leaves the sealing compound exposed to view, but it is found, in practice, that the battery will serve its purpose quite effectively.

In the various constructions described, the box 1 serves as a container for the inner assembly. This box may have its exterior surface finished with any suitable design or printed matter. Also, where the label, or paper covering, 9, is employed, its exterior surface may be printed in a suitable design to harmonize with the remainder of the container.

The foregoing detailed description has been given for clearness of understanding only and no unnecessary limitations should be understood therefrom, but the appended claims should be construed as broadly as permissible, in view of the prior art.

What I regard as new, and desire to secure by Letters Patent, is:

1. A dry-battery comprising a pasteboard box having an open vertical side, horizontally disposed cells in said box having their carbon poles presented to the open side of the box, a sealing compound forming a common seal for said cells, the margins of the flanges of said box projecting beyond said sealing compound, a pasteboard plate in said box adjacent said sealing compound, a covering cemented to said pasteboard plate and having margins cemented to said box, and terminals connected with cells of the upper row and terminating above and secured to the top wall of said box.

2. A dry-battery comprising a pasteboard box having an open vertical side, horizontal cell-compartments in said box, cells in said compartments having carbon poles presented towards the open side of said box, a sealing compound forming a common seal for said compartments, the walls of said box projecting beyond said sealing compound, a pasteboard fillet within the marginal portion of said box, a paper covering cemented to said pasteboard fillet and to the walls of said box, and terminals connected with the electrodes of cells of the top row and terminating above and secured to the top wall of said box.

DWIGHT E. WYRE.